US009969846B1

(12) United States Patent
King et al.

(10) Patent No.: US 9,969,846 B1
(45) Date of Patent: May 15, 2018

(54) GLUTEN-DERIVED FLAME RETARDANT MACROMOLECULES

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/404,272

(22) Filed: Jan. 12, 2017

(51) Int. Cl.
*C08H 1/00* (2006.01)

(52) U.S. Cl.
CPC ..................... *C08H 1/00* (2013.01)

(58) Field of Classification Search
None
See application file for complete search history.

(56) References Cited

U.S. PATENT DOCUMENTS

| | | | |
|---|---|---|---|
| 4,246,360 A | 1/1981 | Brown et al. |
| 6,348,524 B2 | 2/2002 | Bastioli et al. |
| 7,202,289 B2 | 4/2007 | Nozaki et al. |
| 7,915,328 B2 | 3/2011 | Gaggar et al. |
| 7,915,329 B2 | 3/2011 | Gaggar et al. |
| 8,252,852 B2 | 8/2012 | Takenaka et al. |
| 8,969,440 B2 | 3/2015 | Kopannia et al. |
| 2006/0155012 A1 | 7/2006 | Riebel |
| 2012/0029124 A1 | 2/2012 | Norfolk et al. |
| 2012/0276596 A1 | 11/2012 | Pere et al. |
| 2013/0196150 A1 | 8/2013 | Sugino et al. |
| 2015/0315249 A1 | 11/2015 | Netravali et al. |
| 2016/0053047 A1 | 2/2016 | Medoff et al. |

FOREIGN PATENT DOCUMENTS

CA          2139726 A1       7/1995

OTHER PUBLICATIONS

Wu et al., "Highly porous flame-retardant and sustainable biofoams based on wheat gluten and in situ polymerized silica", Journal of Materials Chemistry A, Nov. 2014 (web), pp. 20996-21009, Royal Society of Chemistry (pubs.rsc.org) online, DOI: 10.1039/c4ta04787g, URL: www.pubs.rsc.org/en/content/articlepdf/2014/ta/c4ta04787g.

Laird, "When gluten is not a problem, but a solution", Newsletter, PlasticsToday.com (online), Mar. 30, 2016, 2 pages, URL: www.plasticstoday.com/article/when-gluten-not-problem-solution/19051579024392.

Blomfeldt et al., "Thermal Conductivity and Combustion Properties of Wheat Gluten Foams", Research Article, ACS Applied Materials & Interfaces, vol. 4, Issue 3, Feb. 14, 2012 (web), pp. 1629-1635, ACS Publications (pubs.acs.org) online, DOI: 10.1021/am2017877, URL: www.pubs.acs.org/doi/abs/10.1021/am2017877.

Belitz, et al., "Structure and Function of Gluten Proteins", Cereal Chemistry, vol. 63, Issue 4, Jul.-Aug. 1986, pp. 336-341, American Association of Cereal Chemists, Inc. (aaaccnet.org) online, URL: www.aaccnet.org/publications/cc/backissues/1986/Documents/chem63_336.pdf.

Hong, et al., "Processing rigid wheat gluten biocomposites for high mechanical performance", Composites Part A: Applied Science and Manufacturing, vol. 79, Sep. 2015 (web), pp. 74-81, Elsevier B.V. (journals.elsevier.com) online, URL: www.sciencedirect.com/science/article/pii/S1359835X15003152.

Langstraat, et al., "Controlling Wheat Gluten Cross-Linking for High Temperature Processing", Industrial Crops and Products, vol. 72, Oct. 2015, pp. 119-124, Special issue derived from International Conference on Biobased Materials and Composites (ICBMC'14), Elsevier B.V. ScienceDirect (sciencedirect.com) online, URL: www.sciencedirect.com/science/article/pii/S0926669014008206.

Jansens, et al., "Effect of molding conditions and moisture content on the mechanical properties of compression molded glassy, wheat gluten bioplastics", Industrial Crops and Products, vol. 44, Jan. 2013, pp. 480-487, ResearchGate.net (online), DOI: 10.1016/j.indcrop.2012.10.006.

Langstraat, et al., "Designing wheat gluten based materials", <https://lirias.kuleuven.be/handle/123456789/503649>, Conference: ICBP, Edition 5, Location: Singapore, date: Jun. 24-27, 2015, Abstract Only, printed Jan. 11, 2017, 3 pages.

Jang et al., *Thermal stability and flammability of coconut fiber reinforced poly(lactic acid) composites*, Composites Part B: Engineering, vol. 43, Issue 5, Jul. 2012, pp. 2434-2438, Elsevier B.V. ScienceDirect (sciencedirect.com) online, URL: www.sciencedirect.com/science/article/pii/S1359836811004720.

Hickman, *Non-food uses for wheat; U.S., Canada explore additional markets*, Milling & Baking News, vol. 73, No. 12, May 17, 1994, 5 pages, Sosland Publishing Co., Kansas City, MO.

Eldred et al., *Catalytic Transamidation under Moderate Conditions*, Journal of the American Chemical Society, Mar. 2003, vol. 125, Issue 12, pp. 3422-3423 (online), URL: http://pubs.acs.org/doi/abs/10.1021/ja028242h.

Stephenson, *Catalytic Transamidation Reactions Compatible with Tertiary Amide Metathesis under Ambient Conditions*, Journal of the American Chemical Society, Jul. 2009, vol. 131, Issue 29, pp. 10003-10008, (online), URL: http://pubs.acs.org/doi/abs/10.1021/.

Hosseini-Sarvari et al., *Nano Sulfated Titania as Solid Acid Catalyst in Direct Synthesis of Fatty Acid Amides*, Journal of Organic Chemistry, Mar. 2011, vol. 76, Issue 8, pp. 2853-2859 (online), URL: http://pubs.acs.org/doi/abs/10.1021/jo2002769.

UCLA, *Transamidation*, Illustrated Glossary of Organic Chemistry, University of California Department of Chemistry & Biochemistry (chemistry.ucla.edu) online, [accessed Oct. 5, 2016], URL: http://www.chem.ucla.edu/~harding/IGOC/T/transamidation.html.

(Continued)

*Primary Examiner* — Suzanne M Noakes
(74) *Attorney, Agent, or Firm* — Roy R. Salvagio; Robert R. Williams; Kennedy Lenart Spraggins LLP (57) ABSTRACT

A gluten-derived flame retardant macromolecule includes a phosphorus moiety chemically bonded to an amino acid side chain of a gluten protein.

16 Claims, 9 Drawing Sheets

(56) References Cited

OTHER PUBLICATIONS

Heredia-Sandoval et al., *Transamidation of Gluten Proteins During the Bread-Making Process of Wheat Flour to Produce Breads With Less Immunoreactive Gluten* (Abstract Only), Food & Function, Issue 8, May 2004, 2 pages, Royal Society of Chemistry, URL: pubs.rsc.org/en/content/articlelanding/2014/fo/c4fo00118d#!divAbstract.

Appendix P; List of IBM Patent or Applications Treated as Related, May 4, 2017, 2 pages.

GLUTEN-DERIVED FLAME RETARDANT MACROMOLECULES

BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

SUMMARY

According to an embodiment, a process of forming a gluten-derived flame retardant macromolecule is disclosed. The process includes forming a mixture that includes a gluten protein, the gluten protein including a carboxylic acid-functionalized amino acid side chain. The process also includes chemically reacting the carboxylic acid-functionalized amino acid side chain with a phosphorus-containing material to form a gluten-derived flame retardant macromolecule.

According to another embodiment, a process of forming a gluten-derived flame retardant macromolecule is disclosed. The process includes forming a mixture that includes a gluten protein, the gluten protein including a hydroxyl-functionalized amino acid side chain. The process also includes chemically reacting the hydroxyl-functionalized amino acid chain with a phosphorus-containing material to form a gluten-derived flame retardant macromolecule.

According to another embodiment, a gluten-derived flame retardant macromolecule includes a phosphorus moiety chemically bonded to an amino acid side chain of a gluten protein.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes gluten-derived flame retardant macromolecules and processes of forming gluten-derived flame retardant macromolecules. The gluten-derived flame retardant macromolecules of the present disclosure have a phosphorus moiety chemically bonded to an amino acid side chain (or multiple amino acid side chains) of a gluten protein. In some cases, the gluten-derived flame retardant macromolecules may be formed via chemical reactions of phosphorus-containing materials with one or more carboxylic acid-functionalized amino acid side chains of a gluten protein. In other cases, the gluten-derived flame retardant macromolecules may be formed via chemical reactions of phosphorus-containing materials with one or more hydroxyl-functionalized amino acid side chains of a gluten protein.

In the present disclosure, a gluten protein (or multiple gluten proteins) is modified to chemically bond a flame retardant phosphorus moiety directly to the gluten structure via a chemical reaction with a functional group of an amino acid side chain. Gluten is a protein, and as such, it is composed of sequences of amino acids. These amino acid sequences are characterized by amide linkages formed between the amine of one amino acid and the carboxylic acid group of another amino acid. The carbon in between the carboxylic acid and the amine is referred to as the alpha ($\alpha$) carbon and can be functionalized with a number of different side chains. In most gluten proteins, glutamic acid typically makes up approximately 37 percent of the amino acid content. Other amino acid components described herein include tyrosine (making up approximately 4 percent), threonine (making up approximately 3 percent), and serine (making up approximately 5 percent). As described further herein, various phosphorus moieties can be bonded to the functional groups on these amino acid side chains. The phosphorus-functionalized gluten proteins or copolymers of gluten can be blended into a polymer to render the composite material flame resistant.

In some cases, one or more of the gluten-derived flame retardant macromolecules of the present disclosure may be blended with a polymeric material, and the resulting blend may have flame retardancy characteristics that satisfy a plastics flammability standard. As an example, the plastics flammability standard may be specified by Underwriters Laboratories® (referred to as "UL" herein), such as UL 94, entitled "Standard for Safety of Flammability of Plastic Materials for Parts in Devices and Appliances testing." The UL 94 standard defines various criteria that may be used to classify a particular plastic based on a degree of flame-retardancy. To illustrate, in order for a plastic to be assigned a "V-1" classification, UL 94 specifies that burning stops within 30 seconds on a vertical specimen and that drips of particles are allowed as long as the particles are not inflamed. In order for the plastic to be assigned a "V-0" classification, UL 94 specifies that burning stops within 10 seconds on a vertical specimen and that drips of particles are allowed as long as the particles are not inflamed. Testing may be conducted on a 5-inch×0.5-inch (12.7 cm×1.27 cm) specimen of a minimum approved thickness (according to the UL 94 standard). It will be appreciated that the UL 94 V-1 and V-0 plastics flammability standards are for example purposes only. Alternative or additional plastics flammability standard(s) may be applicable in various contexts.

Figure 1:
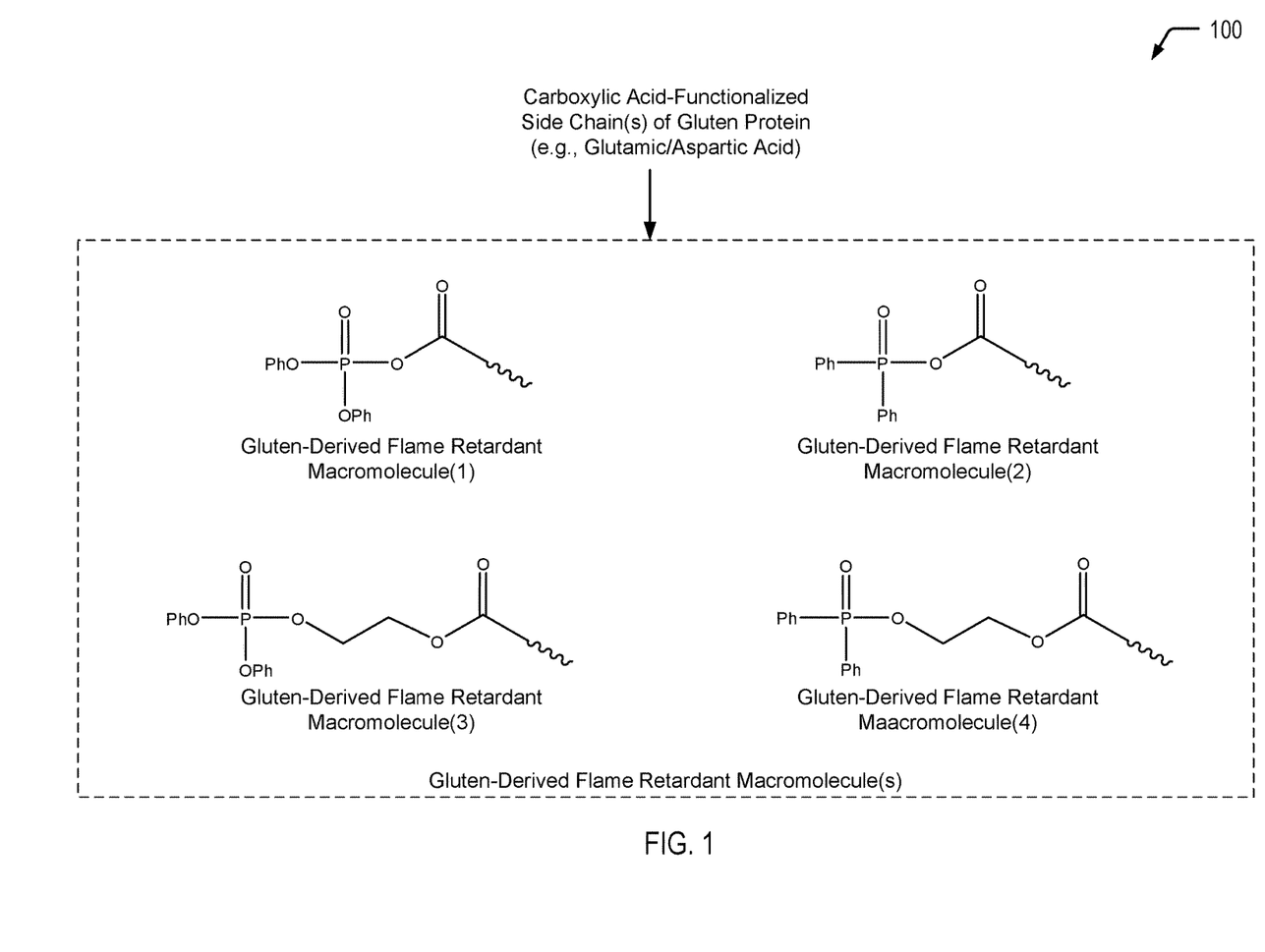
FIG. 1 is a diagram illustrating examples of gluten-derived flame retardant macromolecules having a phosphorus moiety bonded to a carboxylic acid-functionalized amino acid side chain of a gluten protein, according to one embodiment.

Referring to FIG. 1, a diagram 100 illustrates examples of gluten-derived flame retardant macromolecules having a phosphorus moiety bonded to a carboxylic acid-functionalized amino acid side chain of a gluten protein. The carboxylic acid-functionalized amino acid side chain may correspond to a glutamic acid side chain of the gluten protein, an aspartic acid side chain of the gluten protein, or a combination thereof. The gluten-derived flame retardant macromolecules depicted in FIG. 1 may be formed according to the processes illustrated and further described herein with respect to FIGS. 2A-2B and FIGS. 3A-3B.

FIG. 1 illustrates a first gluten-derived flame retardant macromolecule (identified as "Gluten-Derived Flame Retardant Macromolecule(1)" in FIG. 1), a second gluten-derived flame retardant macromolecule (identified as "Gluten-Derived Flame Retardant Macromolecule(2)" in FIG. 1), a third gluten-derived flame retardant macromolecule (identified as "Gluten-Derived Flame Retardant Macromolecule(3)" in FIG. 1), and a fourth gluten-derived flame retardant macromolecule (identified as "Gluten-Derived Flame Retardant Macromolecule(4)" in FIG. 1).

Figure 2A:
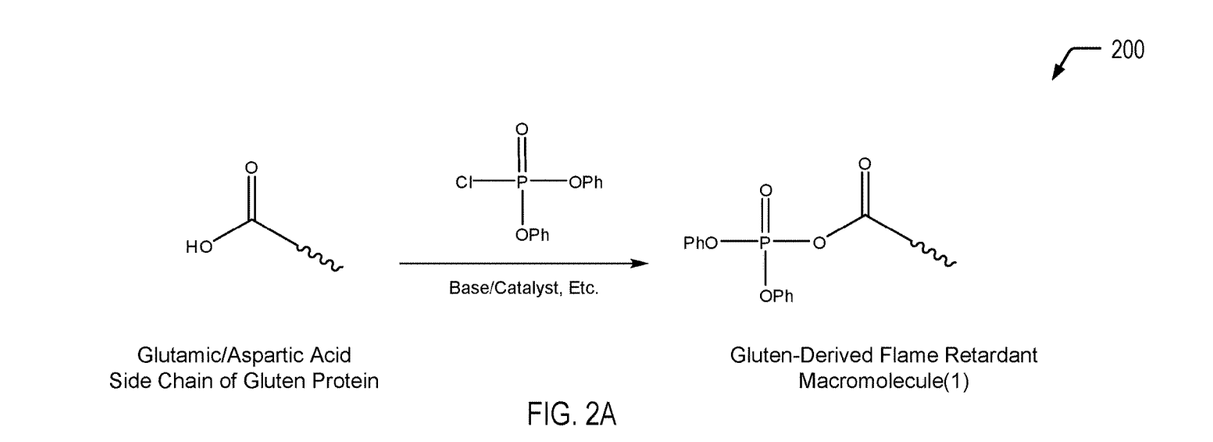
FIGS. 2A and 2B are chemical reaction diagrams illustrating examples of processes of forming two of the gluten-derived flame retardant macromolecules depicted in FIG. 1.

The first gluten-derived flame retardant macromolecule depicted in FIG. 1 includes a terminal phosphate group and may be formed according to the process described herein with respect to FIG. 2A, where a glutamic/aspartic acid side chain is chemically reacted with a phosphorus-containing material which contains a phosphoryl group and a chloride group (e.g., a phosphonate material, such as diphenyl chlorophosphate). The second gluten-derived flame retardant macromolecule depicted in FIG. 1 includes a terminal phosphinate group and may be formed according to the process described herein with respect to FIG. 2B, where a glutamic/aspartic acid side chain is chemically reacted with a phosphorus-containing material which contains a phosphoryl group and a chloride group (e.g., a phosphine oxide material, such as chlorodiphenylphosphine oxide).

Figure 3A:
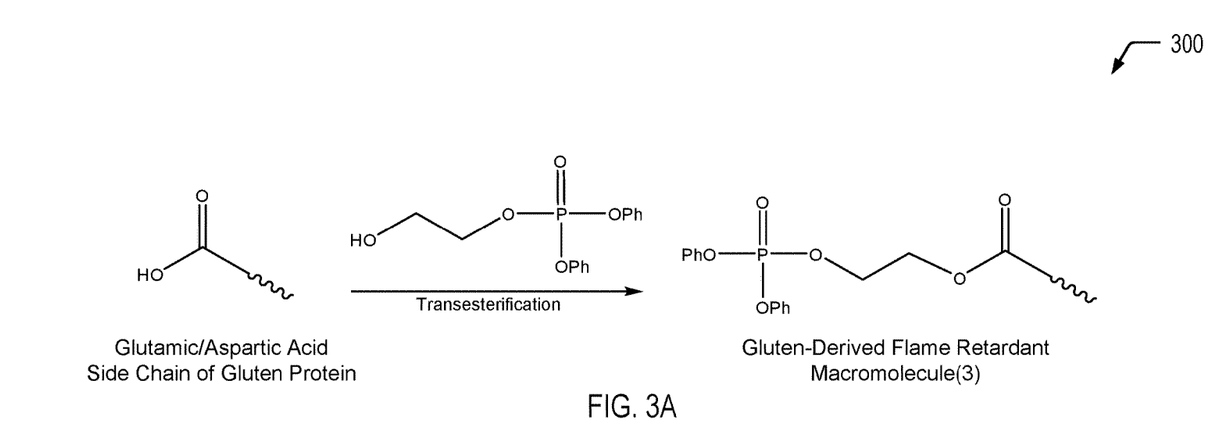
FIGS. 3A and 3B are chemical reaction diagrams illustrating examples of processes of forming two of the gluten-derived flame retardant macromolecules depicted in FIG. 1.

The third gluten-derived flame retardant macromolecule depicted in FIG. 1 includes a terminal phosphate group and may be formed according to the process described herein with respect to FIG. 3A, where a glutamic/aspartic acid side chain is chemically reacted with a phosphorus-containing material which contains a phosphoryl group and an alkoxy group (e.g., a phosphate material having an alkoxy chain bonded to one of the oxygen atoms of the three O—P bonds). The fourth gluten-derived flame retardant macromolecule depicted in FIG. 1 includes a terminal phosphinate group and may be formed according to the process described herein with respect to FIG. 3B, where a glutamic/aspartic acid side chain is chemically reacted with a phosphorus-containing material which contains a phosphoryl group and an alkoxy group (e.g., a phosphinate material having an alkoxy chain bonded to the oxygen atom of the single O—P bond).

Thus, FIG. 1 illustrates examples of gluten-derived flame retardant macromolecules having a phosphorus moiety bonded to a carboxylic acid-functionalized amino acid side chain (e.g., glutamic/aspartic acid side chains) of a gluten protein. Chemically bonding a phosphorus moiety to one or more amino acid side chains of a gluten protein imparts flame retardant characteristics. Such phosphorus-functionalized gluten proteins or copolymers of gluten can be blended into a polymer to render the composite material flame resistant. In some cases, the polymeric blend may satisfy a plastics flammability standard, such as the UL V-0 or V-1 standards, while also increasing the biorenewable content of the polymeric blend.

Figure 2B:
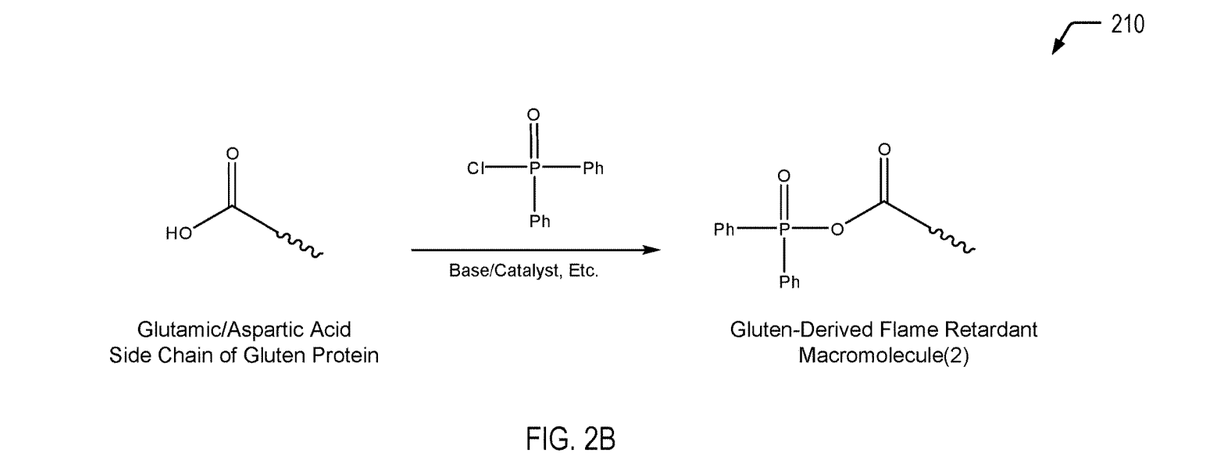

Referring to FIGS. 2A and 2B, chemical reaction diagrams 200 and 210 illustrate particular embodiments of processes for forming gluten-derived flame retardant macromolecules using reagents, catalysts, etc. (identified as "Base/Catalyst, Etc." in FIGS. 2A and 2B). In FIGS. 2A and 2B, a carboxylic acid functional group of a glutamic/aspartic acid side chain is chemically reacted with a phosphorus-containing material (that includes a phosphoryl group and a chloride group) to bind a phosphorus moiety to the glutamic/aspartic acid side chain of the gluten protein, thereby imparting flame retardancy characteristics to the gluten protein.

FIGS. 2A and 2B illustrate that glutamic/aspartic acid components of gluten have a carboxylic acid group in their side chains. In a solution/suspension that includes a gluten protein, the amino acid may exist as a carboxylate anion. However, the material may be converted back and forth from a carboxylate to carboxylic acid by raising or lowering the pH of a gluten solution or suspension. The chemical reactions depicted in FIGS. 2A and 2B may be performed in a solution or a suspension, depending on the particular solvents that are used. To illustrate, wheat gluten is composed of two proteins, glutenin and gliadin. Glutenin is soluble in dilute acid (e.g., acetic acid) as well as alkali (e.g., 0.1 N NaOH). Gliadin is soluble in 60-80% alcohol. The reactions may require the use of an inorganic sodium or silver(I) base (e.g., a hydroxide), or the use of an organic base such as N-methylmorpholine, triethylamine, or diisopropylethylamine.

The chemical reaction diagram 200 depicted in FIG. 2A illustrates that a glutamic/aspartic acid side chain of a gluten protein may be chemically reacted with a phosphonate material. In the particular embodiment depicted in FIG. 2A, the phosphonate material includes diphenyl chlorophosphate. FIG. 2A illustrates that the chemical reaction of the hydroxyl group in the amino acid side chain and the chloride group of the phosphonate material results in the formation of a gluten-derived flame retardant macromolecule having a side chain that includes a terminal phosphate group, corresponding to the first gluten-derived flame retardant macromolecule depicted in FIG. 1.

The chemical reaction diagram 210 depicted in FIG. 2B illustrates that a glutamic/aspartic acid side chain of a gluten protein may be chemically reacted with a phosphine oxide material. In the particular embodiment depicted in FIG. 2B, the phosphine oxide material includes chlorodiphenylphosphine oxide. FIG. 2B illustrates that the chemical reaction of the hydroxyl group in the amino acid side chain and the chloride group of the phosphine oxide material results in the formation of a gluten-derived flame retardant macromolecule having a side chain that includes a terminal phosphinate group, corresponding to the second gluten-derived flame retardant macromolecule depicted in FIG. 1.

As a prophetic example, the gluten protein and a catalyst (e.g., magnesia) may be suspended in diphenyl chlorophosphate (in the case of FIG. 2A) or diphenyl chlorophosphine oxide (in the case of FIG. 2B) and heated to reflux. The reaction may also be performed in a solvent or mixture of solvents which may include chloroform, chloroethane, chlorobenzene, isomers of dichlorobenzene, tetrahydrofuran, 1,4-dioxane, dimethylsulfoxide, N,N-dimethylformamide, N,N-dimethylacetamide, or N-Methyl-2-pyrrolidone. The reaction may be monitored by NMR, gel permeation chromatography, HPLC, or FTIR. Upon completion, the reaction mixture may be poured into a non-polar solvent such as hexane or acetone, filtered, and washed in a Soxhlet extractor. The resultant material may be purified further by centrifugation and dried in vacuo.

Thus, FIGS. 2A and 2B illustrate examples of processes of forming gluten-derived flame retardant macromolecules via a chemical reaction of a phosphorus-containing material with a carboxylic acid-functionalized amino acid side chain (e.g., a glutamic/aspartic acid side chain) of a gluten protein. In some cases, one or more of the gluten-derived flame retardant macromolecules depicted in FIGS. 2A and 2B may be blended with a polymeric material, such as a polylactic acid (PLA) material, a polyurethane material, a polycarbonate material, an acrylonitrile butadiene styrene (ABS) material, a polyester material, a polyether material, or a combination thereof (among other alternatives). The addition of the gluten-derived flame retardant macromolecule(s) to the polymeric material may enable the polymeric material to satisfy a plastics flammability standard while also increasing the biorenewable content of the polymeric material.

Figure 3B:
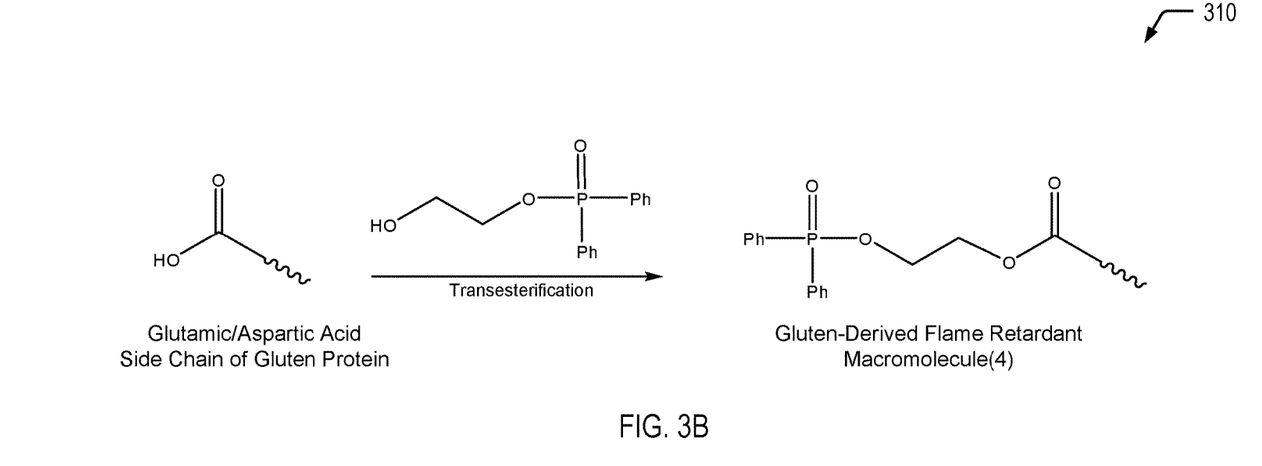

Referring to FIGS. 3A and 3B, chemical reaction diagrams 300 and 310 illustrate particular embodiments of processes for forming gluten-derived flame retardant macromolecules by a transesterification reaction. In FIGS. 3A and 3B, a carboxylic acid functional group of a glutamic/aspartic acid side chain is chemically reacted with a phosphorus-containing material that includes a phosphoryl group and an alkoxy group to bind a phosphorus moiety to the glutamic/aspartic acid side chain of the gluten protein, thereby imparting flame retardancy characteristics to the gluten protein.

FIGS. 3A and 3B illustrate that glutamic/aspartic acid components of gluten have a carboxylic acid group in their side chains. In a solution/suspension that includes a gluten protein, the amino acid may exist as a carboxylate anion. However, the material may be converted back and forth from a carboxylate to carboxylic acid by raising or lowering the pH of a gluten solution or suspension. The chemical reactions depicted in FIGS. 3A and 3B may be performed in a solution or a suspension, depending on the particular solvents that are used. To illustrate, wheat gluten is composed of two proteins, glutenin and gliadin. Glutenin is soluble in dilute acid (e.g., acetic acid) as well as alkali (e.g., 0.1 N NaOH). Gliadin is soluble in 60-80% alcohol.

The chemical reaction diagram 300 depicted in FIG. 3A illustrates that a glutamic/aspartic acid side chain may be chemically reacted with a phosphonate material, resulting in the formation of a gluten-derived flame retardant macromolecule having a side chain that includes a terminal phosphate group, corresponding to the third gluten-derived flame retardant macromolecule depicted in FIG. 1.

The chemical reaction diagram 310 depicted in FIG. 3B illustrates that a glutamic/aspartic acid side chain of a gluten protein may be chemically reacted with a phosphine oxide material, resulting in the formation of a gluten-derived flame retardant macromolecule having a side chain that includes a terminal phosphinate group, corresponding to the fourth gluten-derived flame retardant macromolecule depicted in FIG. 1.

As a prophetic example, transesterification of a glutamic/aspartic acid with a phosphonate material having a hydroxyl group (in the case of FIG. 3A) or a phosphine oxide material having a hydroxyl group (in the case of FIG. 3B) may be carried out by heating a solution of the materials at an elevated temperature in the presence of a catalyst. The reaction may be carried out neat (with the gluten suspended in an excess of the phosphorus-containing material having a hydroxyl group), or in a solvent or mixture of solvents that may include chloroform, chloroethane, chlorobenzene, isomers of dichlorobenzene, tetrahydrofuran, 1,4-dioxane, dimethylsulfoxide, N,N-dimethylformamide, N,N-dimethylacetamide, or N-Methyl-2-pyrrolidone. This catalyst may be acidic in nature, or the catalyst may promote a condensation reaction (e.g., dibutyltin dilaurate) and may be used in amounts ranging from 0.1 to 10.0 mol percent. The temperature may be above 100° C. and may be at the reflux temperature of the phosphorus-containing material with the hydroxyl group. The reaction time may be in excess of 1 hour. The reaction may be finished by pouring the reaction mixture into a solvent such as water, methanol, ethanol, acetone, etc. and may cause precipitation of the gluten-derived flame retardant macromolecule, which then may be filtered, and washed in a Soxhlet extractor. The resultant material may be purified further by centrifugation and dried in vacuo.

Thus, FIGS. 3A and 3B illustrate examples of processes of forming gluten-derived flame retardant macromolecules via a chemical reaction of a phosphorus-containing material with a carboxylic acid-functionalized amino acid side chain of a gluten protein (e.g., a glutamic/aspartic acid side chain). In some cases, one or more of the gluten-derived flame retardant macromolecules depicted in FIGS. 3A and 3B may be blended with a polymeric material, such as a PLA material, a polyurethane material, a polycarbonate material, an ABS material, a polyester material, a polyether material, or a combination thereof (among other alternatives). The addition of the gluten-derived flame retardant macromolecule(s) to the polymeric material may enable the polymeric material to satisfy a plastics flammability standard while also increasing the biorenewable content of the polymeric material.

Figure 4:
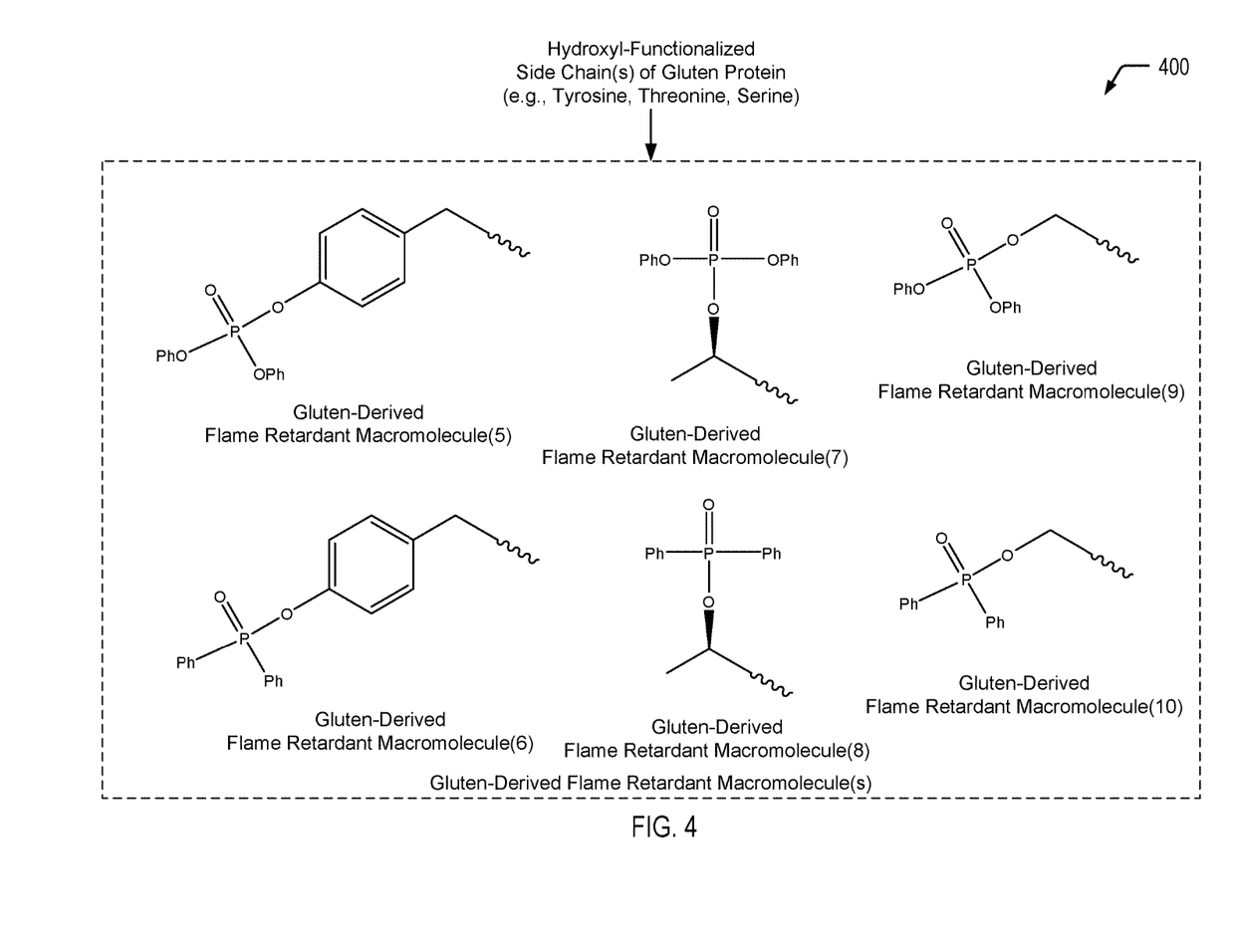
FIG. 4 is a diagram illustrating examples of gluten-derived flame retardant macromolecules having a phosphorus moiety bonded to a hydroxyl-functionalized amino acid side chain of a gluten protein, according to one embodiment.

Referring to FIG. 4, a diagram 400 illustrates examples of gluten-derived flame retardant macromolecules having a phosphorus moiety bonded to a hydroxyl-functionalized amino acid side chain of a gluten protein. In the particular embodiment depicted in FIG. 4, the gluten-derived flame retardant macromolecules represent examples of gluten-derived flame retardant macromolecules that may be formed via a chemical reaction with tyrosine, threonine, and serine amino acid side chains of a gluten protein. The gluten-derived flame retardant macromolecules depicted in FIG. 4 may be formed according to the processes illustrated and further described herein with respect to FIGS. 5A-5B, FIGS. 6A-6B, and FIGS. 7A-7B.

Figure 5A:
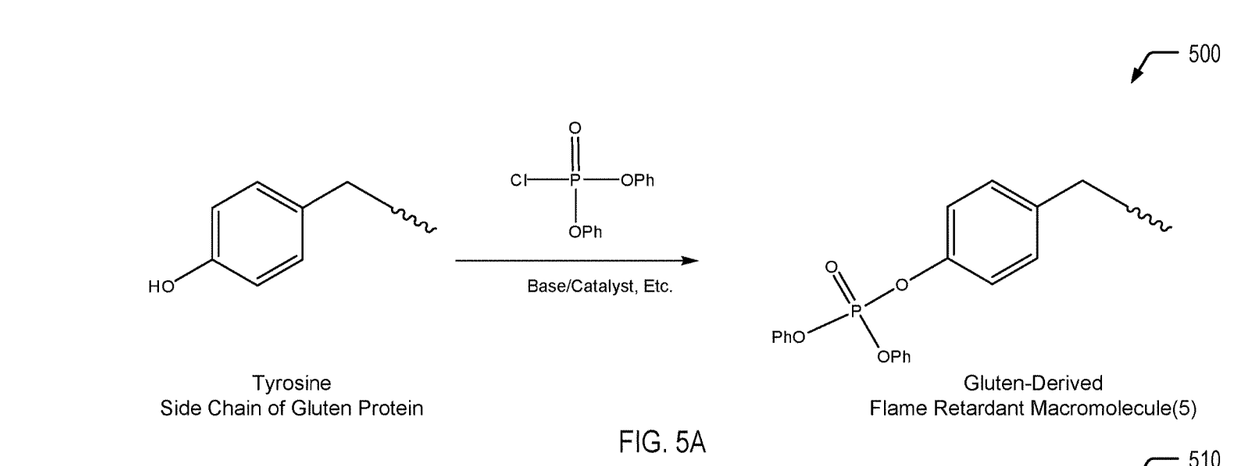
FIGS. 5A and 5B are chemical reaction diagrams illustrating examples of processes of forming two of the gluten-derived flame retardant macromolecules depicted in FIG. 4 via a chemical reaction of a phosphorus-containing material with a hydroxyl group of a tyrosine side chain of a gluten protein.
Figure 5B:
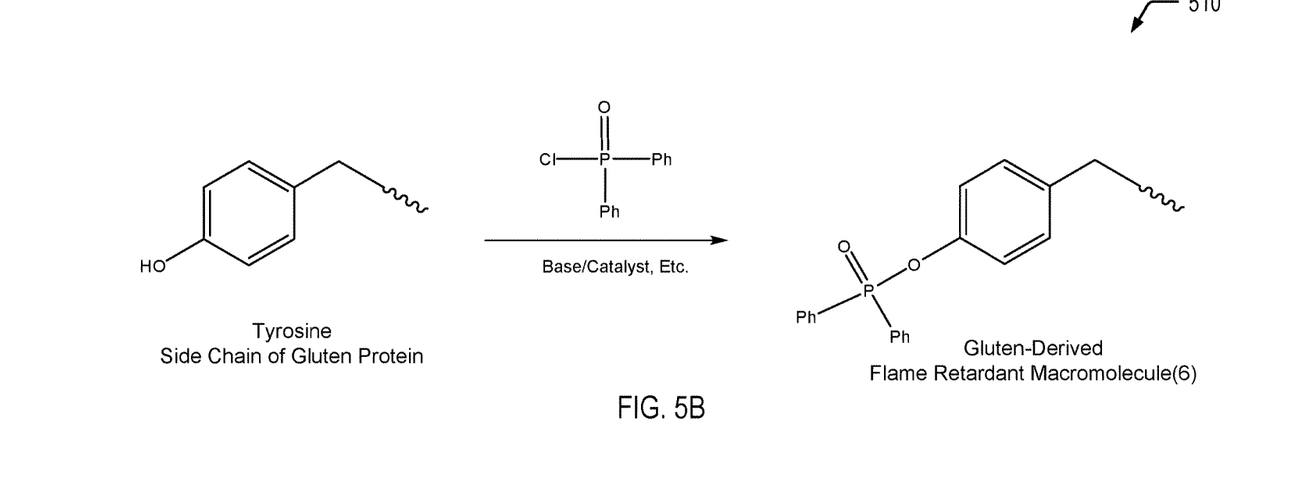

FIG. 4 illustrates a fifth gluten-derived flame retardant macromolecule (identified as "Gluten-Derived Flame Retardant Macromolecule(5)" in FIG. 4) and a sixth gluten-derived flame retardant macromolecule (identified as "Gluten-Derived Flame Retardant Macromolecule(6)" in FIG. 4), each of which may be formed via a chemical reaction of a phosphorus-containing material with a tyrosine side chain (as illustrated and described further herein with respect to FIGS. 5A and 5B).

Figure 6A:
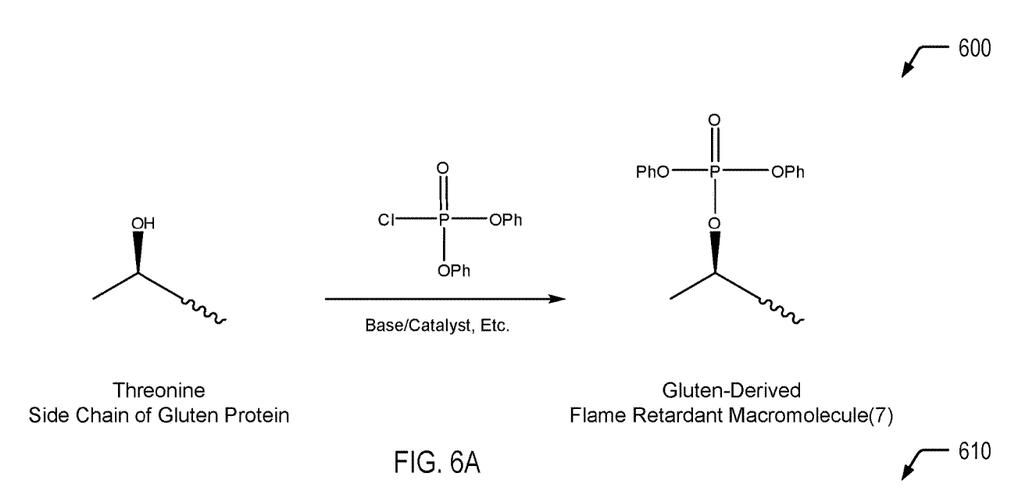
FIGS. 6A and 6B are chemical reaction diagrams illustrating examples of processes of forming two of the gluten-derived flame retardant macromolecules depicted in FIG. 4 via a chemical reaction of a phosphorus-containing material with a hydroxyl group of a threonine side chain of a gluten protein.
Figure 6B:
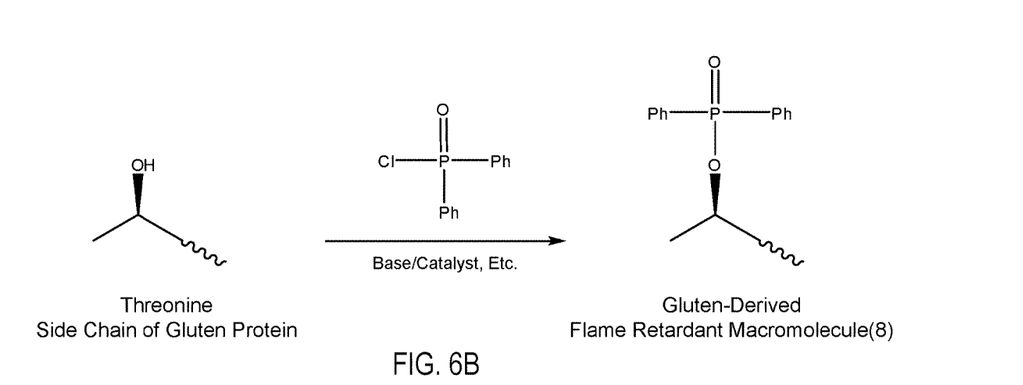

FIG. 4 also illustrates a seventh gluten-derived flame retardant macromolecule (identified as "Gluten-Derived Flame Retardant Macromolecule(7)" in FIG. 4) and an eighth gluten-derived flame retardant macromolecule (identified as "Gluten-Derived Flame Retardant Macromolecule (8)" in FIG. 4), each of which may be formed via a chemical reaction of a phosphorus-containing material with a threonine side chain of a gluten protein (as illustrated and described further herein with respect to FIGS. 6A and 6B).

Figure 7A:
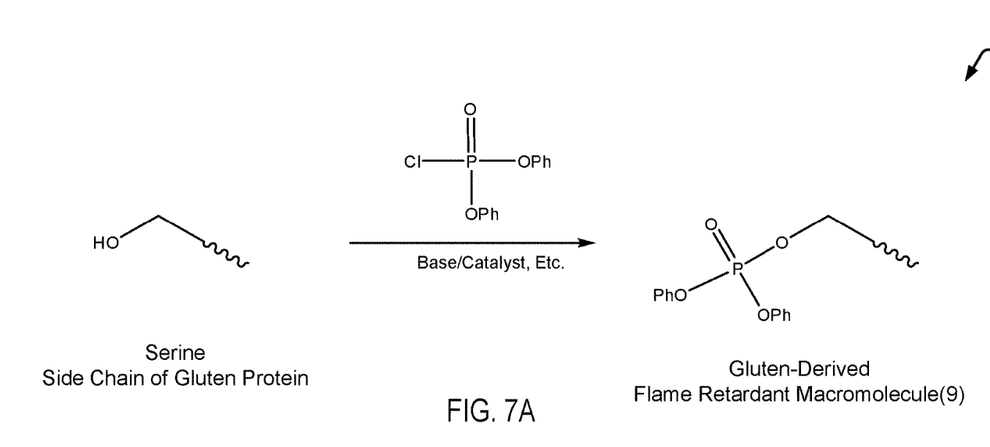
FIGS. 7A and 7B are chemical reaction diagrams illustrating examples of processes of forming two of the gluten-derived flame retardant macromolecules depicted in FIG. 4 via a chemical reaction of a phosphorus-containing material with a hydroxyl group of a serine side chain of a gluten protein.
Figure 7B:
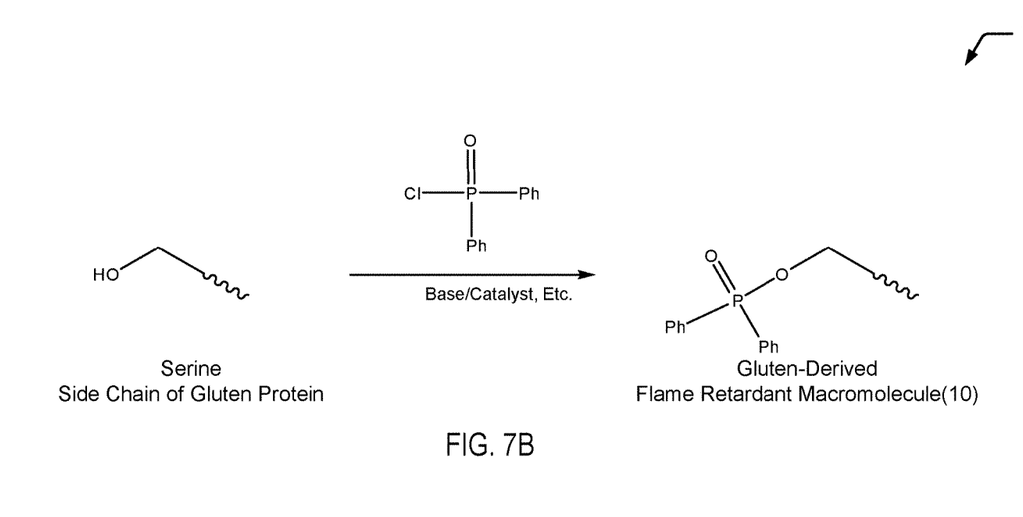

FIG. 4 further illustrates a ninth gluten-derived flame retardant macromolecule (identified as "Gluten-Derived Flame Retardant Macromolecule(9)" in FIG. 4) and a tenth gluten-derived flame retardant macromolecule (identified as "Gluten-Derived Flame Retardant Macromolecule(10)" in FIG. 4), each of which may be formed via a chemical reaction of a phosphorus-containing material with a serine side chain of a gluten protein (as illustrated and described further herein with respect to FIGS. 7A and 7B).

The fifth gluten-derived flame retardant macromolecule depicted in FIG. 4 includes a terminal phosphate group and may be formed according to the process described herein with respect to FIG. 5A, where a tyrosine side chain is chemically reacted with a phosphorus-containing material which contains a phosphoryl group and a chloride group (e.g., a phosphonate material, such as diphenyl chlorophosphate). The sixth gluten-derived flame retardant macromolecule depicted in FIG. 4 includes a terminal phosphinate group and may be formed according to the process described herein with respect to FIG. 5B, where a tyrosine side chain is chemically reacted with a phosphorus-containing material which contains a phosphoryl group and a chloride group (e.g., a phosphine oxide material, such as chlorodiphenylphosphine oxide).

The seventh gluten-derived flame retardant macromolecule depicted in FIG. 4 includes a side-chain phosphate group and may be formed according to the process described herein with respect to FIG. 6A, where a threonine side chain is chemically reacted with a phosphorus-containing material which contains a phosphoryl group and a chloride group (e.g., a phosphonate material, such as diphenyl chlorophosphate). The eighth gluten-derived flame retardant macromolecule depicted in FIG. 4 includes a side-chain phosphinate group and may be formed according to the process described herein with respect to FIG. 6B, where a threonine side chain is chemically reacted with a phosphorus-containing material which contains a phosphoryl group and a chloride group (e.g., a phosphine oxide material, such as chlorodiphenylphosphine oxide).

The ninth gluten-derived flame retardant macromolecule depicted in FIG. 4 includes a terminal phosphate group and may be formed according to the process described herein with respect to FIG. 7A, where a serine side chain is chemically reacted with a phosphorus-containing material which contains a phosphoryl group and a chloride group (e.g., a phosphonate material, such as diphenyl chlorophosphate). The tenth gluten-derived flame retardant macromolecule depicted in FIG. 4 includes a terminal phosphinate group and may be formed according to the process described herein with respect to FIG. 7B, where a serine side chain is chemically reacted with a phosphorus-containing material which contains a phosphoryl group and a chloride group (e.g., a phosphine oxide material, such as chlorodiphenylphosphine oxide).

Thus, FIG. 4 illustrates examples of gluten-derived flame retardant macromolecules having a phosphorus moiety bonded to a hydroxyl-functionalized amino acid side chain (e.g., tyrosine/threonine/serine side chains) of a gluten protein. Chemically bonding a phosphorus moiety to one or more amino acid side chains of a gluten protein imparts flame retardant characteristics. Such phosphorus-functionalized gluten proteins or copolymers of gluten can be blended into a polymer to render the composite material flame resistant. In some cases, the polymeric blend may satisfy a plastics flammability standard, such as the UL V-0 or V-1 standards, while also increasing the renewable content of the polymeric blend.

Referring to FIGS. 5A and 5B, chemical reaction diagrams 500 and 510 illustrate particular embodiments of processes for forming gluten-derived flame retardant macromolecules using reagents, catalysts, etc. (identified as "Base/Catalyst, Etc." in FIGS. 5A and 5B). In FIGS. 5A and 5B, a hydroxyl group of a tyrosine side chain is chemically reacted with a phosphorus-containing material to bind a phosphorus moiety to the tyrosine side chain of the gluten protein, thereby imparting flame retardancy characteristics to the gluten protein.

The chemical reaction diagram 500 depicted in FIG. 5A illustrates that a tyrosine side chain of a gluten protein may be chemically reacted with a phosphonate material. In the particular embodiment depicted in FIG. 5A, the phosphonate material includes diphenyl chlorophosphate. FIG. 5A illustrates that the chemical reaction of the hydroxyl group in the tyrosine side chain and the chloride group of the phosphonate material results in the formation of a gluten-derived flame retardant macromolecule having a side chain that includes a terminal phosphate group, corresponding to the fifth gluten-derived flame retardant macromolecule depicted in FIG. 4.

The chemical reaction diagram 510 depicted in FIG. 5B illustrates that a tyrosine side chain of a gluten protein may be chemically reacted with a phosphine oxide material. In the particular embodiment depicted in FIG. 5B, the phosphine oxide material includes chlorodiphenylphosphine oxide. FIG. 5B illustrates that the chemical reaction of the hydroxyl group in the tyrosine side chain and the chloride group of the phosphine oxide material results in the formation of a gluten-derived flame retardant macromolecule having a side chain that includes a terminal phosphinate group, corresponding to the sixth gluten-derived flame retardant macromolecule depicted in FIG. 4.

As a prophetic example, the gluten protein and a catalyst which may be an organic amine or imine such as dimethylamino pyridine (DMAP) may be suspended in diphenyl chlorophosphate (in the case of FIG. 5A) or diphenyl chlorophosphine oxide (in the case of FIG. 5B) and heated to reflux. The reaction may also be performed in a solvent or mixture of solvents which may include chloroform, chloroethane, chlorobenzene, isomers of dichlorobenzene, tetrahydrofuran, 1,4-dioxane, dimethylsulfoxide, N,N-dimethylformamide, N,N-dimethylacetamide, or N-Methyl-2-pyrrolidone. The reaction may be monitored by NMR, gel permeation chromatography, HPLC, or FTIR. Upon completion, the reaction mixture may be poured into a non-polar solvent such as hexane or acetone, filtered, and washed in a Soxhlet extractor. The resultant material may be purified further by centrifugation and dried in vacuo.

Thus, FIGS. 5A and 5B illustrate examples of processes of forming gluten-derived flame retardant macromolecules via a chemical reaction of a phosphorus-containing material with a hydroxyl-functionalized amino acid side chain (e.g., a tyrosine side chain) of a gluten protein. In some cases, one or more of the gluten-derived flame retardant macromolecules depicted in FIGS. 5A and 5B may be blended with a polymeric material, such as a PLA material, a polyurethane material, a polycarbonate material, an ABS material, a polyester material, a polyether material, or a combination thereof (among other alternatives). The addition of the gluten-derived flame retardant macromolecule(s) to the polymeric material may enable the polymeric material to satisfy a plastics flammability standard while also increasing the biorenewable content of the polymeric material.

Referring to FIGS. 6A and 6B, chemical reaction diagrams 600 and 610 illustrate particular embodiments of processes for forming gluten-derived flame retardant macromolecules using reagents, catalysts, etc. (identified as "Base/Catalyst, Etc." in FIGS. 6A and 6B). In FIGS. 6A and 6B, a hydroxyl group of a threonine side chain is chemically reacted with a phosphorus-containing material to bind a phosphorus moiety to the threonine side chain of the gluten protein, thereby imparting flame retardancy characteristics to the gluten protein. The chemical reactions depicted in FIGS. 6A and 6B may be performed in a manner similar to that described herein with respect to FIGS. 5A and 5B.

The chemical reaction diagram 600 depicted in FIG. 6A illustrates that a threonine side chain of a gluten protein may be chemically reacted with a phosphonate material. In the particular embodiment depicted in FIG. 6A, the phosphonate material includes diphenyl chlorophosphate. FIG. 6A illustrates that the chemical reaction of the hydroxyl group in the threonine side chain and the chloride group of the phosphonate material results in the formation of a gluten-derived flame retardant macromolecule having a side chain that includes a phosphate group, corresponding to the seventh gluten-derived flame retardant macromolecule depicted in FIG. 4.

The chemical reaction diagram 610 depicted in FIG. 6B illustrates that a threonine side chain of a gluten protein may be chemically reacted with a phosphine oxide material. In the particular embodiment depicted in FIG. 6B, the phosphine oxide material includes chlorodiphenylphosphine oxide. FIG. 6B illustrates that the chemical reaction of the hydroxyl group in the threonine side chain and the chloride group of the phosphine oxide material results in the formation of a gluten-derived flame retardant macromolecule having a side chain that includes a phosphinate group, corresponding to the eighth gluten-derived flame retardant macromolecule depicted in FIG. 4.

Thus, FIGS. 6A and 6B illustrate examples of processes of forming gluten-derived flame retardant macromolecules via a chemical reaction of a phosphorus-containing material with a hydroxyl-functionalized amino acid side chain (e.g., a threonine side chain) of a gluten protein. In some cases, one or more of the gluten-derived flame retardant macromolecules depicted in FIGS. 6A and 6B may be blended with a polymeric material, such as a PLA material, a polyurethane material, a polycarbonate material, an ABS material, a polyester material, a polyether material, or a combination thereof (among other alternatives). The addition of the gluten-derived flame retardant macromolecule(s) to the polymeric material may enable the polymeric material to satisfy a plastics flammability standard while also increasing the renewable content of the polymeric material.

Referring to FIGS. 7A and 7B, chemical reaction diagrams 700 and 710 illustrate particular embodiments of processes for forming gluten-derived flame retardant macromolecules using reagents, catalysts, etc. (identified as "Base/Catalyst, Etc." in FIGS. 7A and 7B). In FIGS. 7A and 7B, a hydroxyl group of a serine side chain is chemically reacted with a phosphorus-containing material to bind a phosphorus moiety to the serine side chain of the gluten protein, thereby imparting flame retardancy characteristics to the gluten protein. The chemical reactions depicted in FIGS. 7A and 7B may be performed in a manner similar to that described herein with respect to FIGS. 7A and 7B.

The chemical reaction diagram 700 depicted in FIG. 7A illustrates that a serine side chain may be chemically reacted with a phosphonate material. In the particular embodiment depicted in FIG. 7A, the phosphonate material includes diphenyl chlorophosphate. FIG. 7A illustrates that the chemical reaction of the hydroxyl group in the serine side chain and the chloride group of the phosphonate material results in the formation of a gluten-derived flame retardant macromolecule having a side chain that includes a terminal phosphate group, corresponding to the ninth gluten-derived flame retardant macromolecule depicted in FIG. 4.

The chemical reaction diagram 710 depicted in FIG. 7B illustrates that a serine side chain of a gluten protein may be chemically reacted with a phosphine oxide material. In the particular embodiment depicted in FIG. 7B, the phosphine oxide material includes chlorodiphenylphosphine oxide. FIG. 7B illustrates that the chemical reaction of the hydroxyl group in the serine side chain and the chloride group of the phosphine oxide material results in the formation of a gluten-derived flame retardant macromolecule having a side chain that includes a terminal phosphinate group, corresponding to the tenth gluten-derived flame retardant macromolecule depicted in FIG. 4.

Thus, FIGS. 7A and 7B illustrate examples of processes of forming gluten-derived flame retardant macromolecules via a chemical reaction of a phosphorus-containing material with a hydroxyl-functionalized amino acid side chain (e.g., a serine side chain) of a gluten protein. In some cases, one or more of the gluten-derived flame retardant macromolecules depicted in FIGS. 7A and 7B may be blended with a polymeric material, such as a PLA material, a polyurethane material, a polycarbonate material, an ABS material, a polyester material, a polyether material, or a combination thereof (among other alternatives). The addition of the gluten-derived flame retardant macromolecule(s) to the polymeric material may enable the polymeric material to satisfy a plastics flammability standard while also increasing the biorenewable content of the polymeric material.

Figure 8:
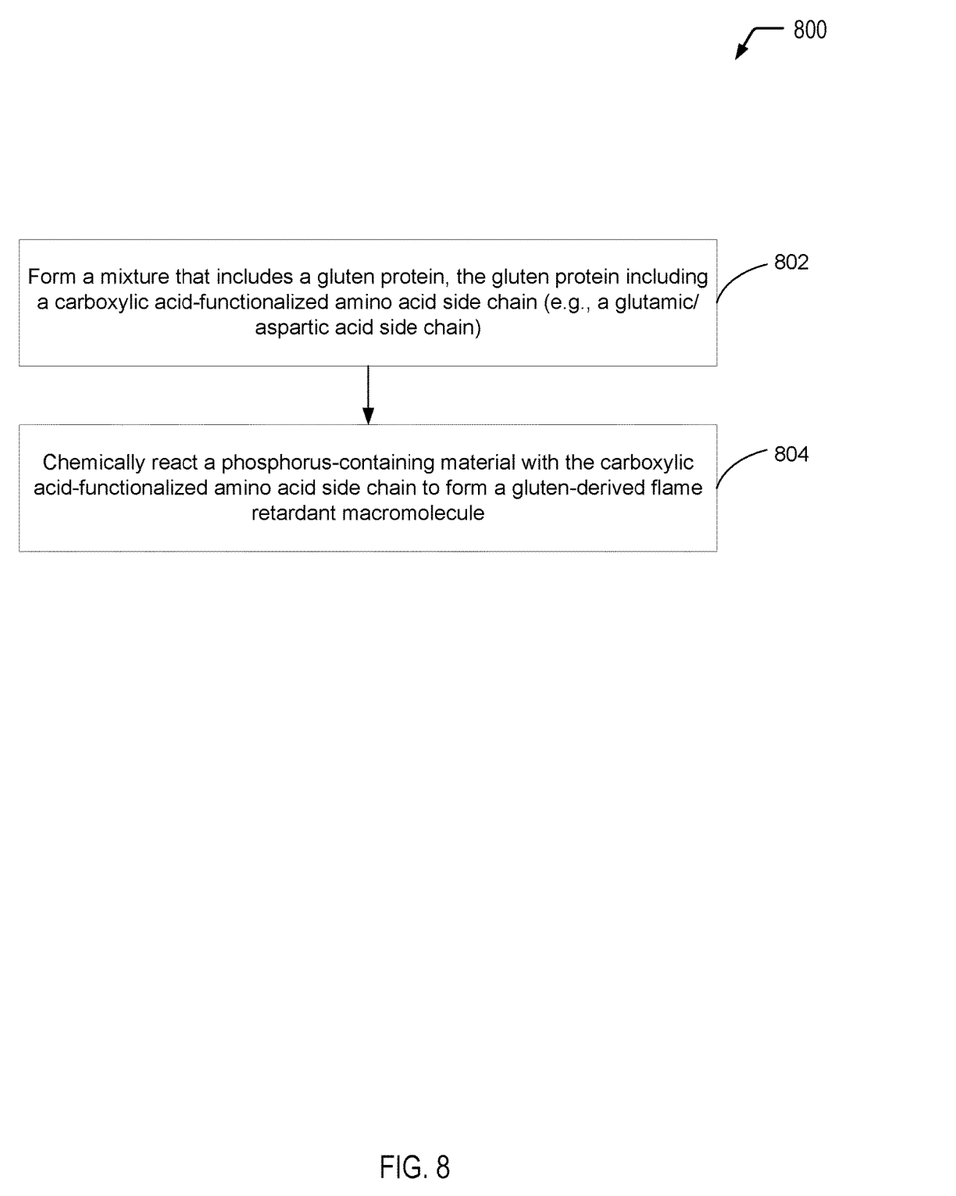
FIG. 8 is a flow diagram showing a particular embodiment of a process of forming a gluten-derived flame retardant macromolecule having a phosphorus moiety bonded to a carboxylic acid-functionalized amino acid side chain of a gluten protein.

Referring to FIG. 8, a flow diagram illustrates a particular embodiment of a process 800 of forming a gluten-derived flame retardant macromolecule. In FIG. 8, the gluten-derived flame retardant macromolecule is formed via a chemical reaction of a phosphorus-containing material with a carboxylic acid-functionalized amino acid side chain of a gluten protein.

The process 800 includes forming a mixture that includes a gluten protein, at 802. The gluten protein includes a carboxylic acid-functionalized amino acid side chain (e.g., a glutamic/aspartic acid side chain). The process 800 includes chemically reacting a phosphorus-containing material with the carboxylic acid-functionalized amino acid side chain to form a gluten-derived flame retardant macromolecule, at 804.

For example, referring to FIGS. 2A and 3A, the chemical reaction of glutamic/aspartic acid side chain with the phosphonate material results in the formation of the gluten-derived flame retardant macromolecule having the terminal phosphate group. As another example, referring to FIGS. 2B and 3B, the chemical reaction of the glutamic/aspartic acid side chain with the phosphine oxide material results in the formation of the gluten-derived flame retardant macromolecule having the terminal phosphinate group.

While not shown in the example of FIG. 8, the process 800 may further include adding the flame retardant gluten-derived macromolecule(s) to a polymeric material to form a blend, such that the resulting blend may have flame retardancy characteristics that satisfy a plastics flammability standard (e.g., the UL 94 V-0, UL 94 V-1 standards, etc.), while also increasing the biorenewable content of the blend. Examples of polymeric materials to which the flame retardant gluten-derived macromolecule(s) may be added include a PLA material, a polyurethane material, a polycarbonate material, an ABS material, a polyester material, a polyether material, or combinations thereof (among other alternatives).

Thus, FIG. 8 illustrates an example of a process of forming a gluten-derived flame retardant macromolecule via a chemical reaction of a phosphorus-containing material with a carboxylic acid-functionalized amino acid side chain of a gluten protein. In some cases, the gluten-derived flame retardant macromolecule(s) formed according to the process 800 of FIG. 8 may be added to a polymeric material to form a blend that satisfies a plastics flammability standard while also increasing the biorenewable content of the blend.

Figure 9:
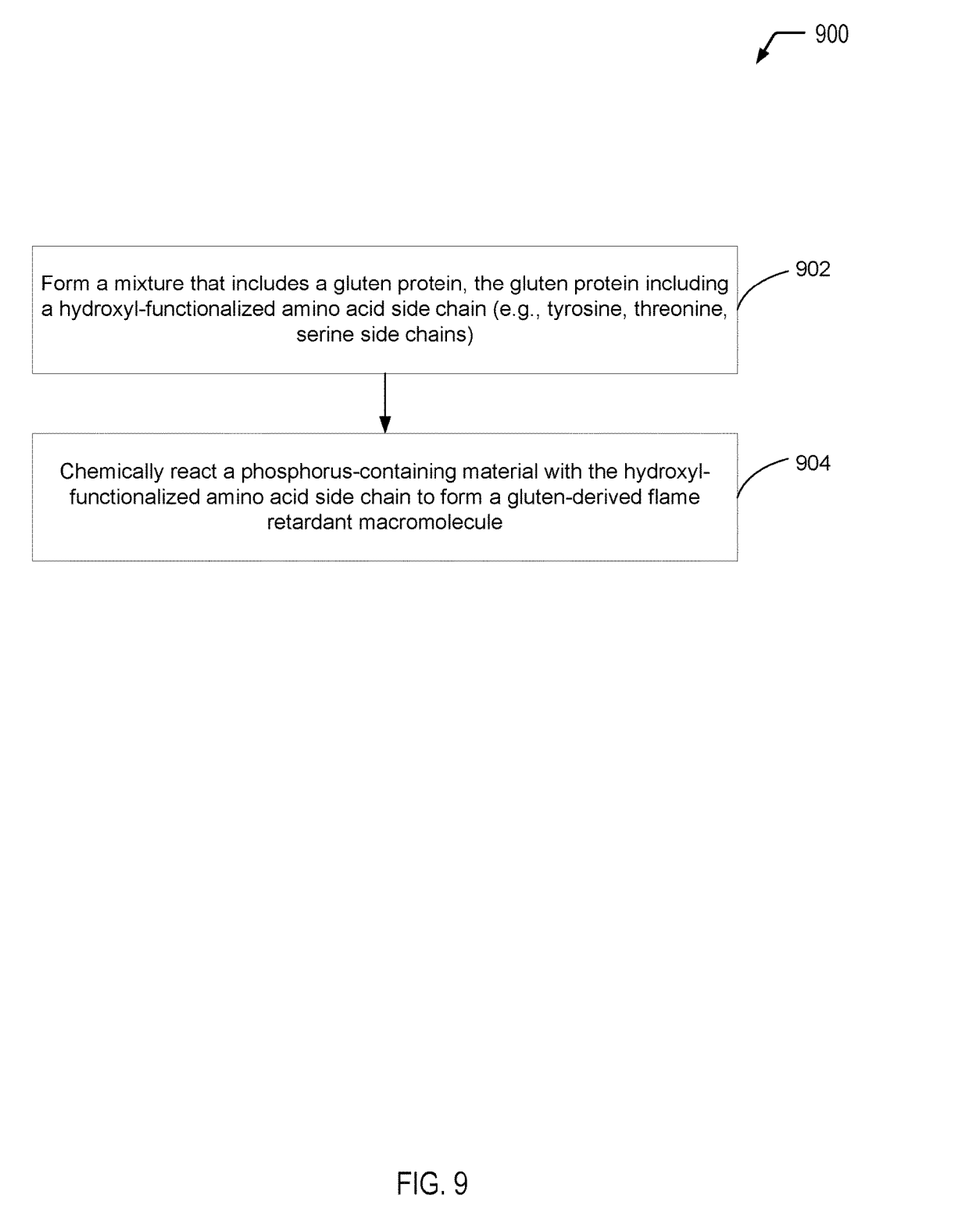
FIG. 9 is a flow diagram showing a particular embodiment of a process of forming a gluten-derived flame retardant macromolecule having a phosphorus moiety bonded to a hydroxyl-functionalized amino acid side chain of a gluten protein.

Referring to FIG. 9, a flow diagram illustrates a particular embodiment of a process 900 of forming a gluten-derived flame retardant macromolecule. In FIG. 9, the gluten-derived flame retardant macromolecule is formed via a chemical reaction of a phosphorus-containing material with a hydroxyl-functionalized amino acid side chain of a gluten protein.

The process 900 includes forming a mixture that includes a gluten protein, at 902. The gluten protein includes hydroxyl-functionalized amino acid side chain(s). For example, referring to FIGS. 5A and 5B, tyrosine represents a first example of an amino acid component of a gluten protein having a hydroxyl-functionalized side chain. As another example, referring to FIGS. 6A and 6B, threonine represents a second example of an amino acid component of a gluten protein having a hydroxyl-functionalized side chain. As yet another example, referring to FIGS. 7A and 7B, serine represents a third example of an amino acid component of a gluten protein having a hydroxyl-functionalized side chain.

The process 900 includes chemically reacting the hydroxyl-functionalized amino acid side chain(s) with a phosphorus-containing material to form a gluten-derived flame retardant macromolecule, at 904. For example, FIGS. 5A, 6A, and 7A, the chemical reaction of a hydroxyl-functionalized amino acid (e.g., tyrosine, threonine, serine) with a phosphonate material results in the formation of the gluten-derived flame retardant macromolecule having a phosphate group. As another example, referring to FIGS. 5B, 6B, and 7B, the chemical reaction of a hydroxyl-functionalized amino acid (e.g., tyrosine, threonine, serine) with a phosphine oxide material results in the formation of the gluten-derived flame retardant macromolecule having a phosphinate group.

While not shown in the example of FIG. 9, the process 800 may further include adding the flame retardant gluten-derived macromolecule(s) to a polymeric material to form a blend, such that the resulting blend may have flame retardancy characteristics that satisfy a plastics flammability standard (e.g., the UL 94 V-0, UL 94 V-1 standards, etc.), while also increasing the biorenewable content of the blend. Examples of polymeric materials to which the flame retardant gluten-derived macromolecule(s) may be added include a PLA material, a polyurethane material, a polycarbonate material, an ABS material, a polyester material, a polyether material, or combinations thereof (among other alternatives).

Thus, FIG. 9 illustrates an example of a process of forming a gluten-derived flame retardant macromolecule via a chemical reaction of a hydroxyl-functionalized amino acid side chain of a gluten protein with a phosphorus-containing material. In some cases, the gluten-derived flame retardant macromolecule formed according to the process 900 of FIG. 9 may be added to a polymeric material to form a blend that satisfies a plastics flammability standard while also increasing the biorenewable content of the blend.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a gluten-derived flame retardant macromolecule, the process comprising:
   forming a mixture that includes a gluten protein, the gluten protein including an amino acid side chain having a carboxylic acid functional group; and
   chemically reacting the carboxylic acid functional group of the amino acid side chain of the gluten protein with a phosphorus-containing material to form a gluten-derived flame retardant macromolecule.

2. The process of claim 1, wherein the amino acid side chain having the carboxylic acid functional group corresponds to a glutamic acid side chain of the gluten protein, an aspartic acid side chain of the gluten protein, or a combination thereof.

3. The process of claim 1, wherein the gluten-derived flame retardant macromolecule includes a terminal phosphate group.

4. The process of claim 1, wherein the gluten-derived flame retardant macromolecule includes a terminal phosphinate group.

5. The process of claim 1, wherein the phosphorus-containing material includes a phosphoryl group and a chloride group.

6. The process of claim 5, wherein the phosphorus-containing material includes a phosphine oxide material.

7. The process of claim 6, wherein the phosphine oxide material includes chlorodiphenylphosphine oxide.

8. The process of claim 5, wherein the phosphorus-containing material includes a phosphonate material.

9. The process of claim 8, wherein the phosphonate material includes diphenyl chlorophosphate.

10. The process of claim 1, wherein the phosphorus-containing material includes a phosphoryl group and an alkoxy group.

11. The process of claim 10, wherein the phosphorus-containing material includes a phosphinate material.

12. The process of claim 10, wherein the phosphorus-containing material includes a phosphate material.

13. A process of forming a gluten-derived flame retardant macromolecule, the process comprising:
- forming a mixture that includes a gluten protein, the gluten protein including an amino acid side chain having a hydroxyl functional group; and
- chemically reacting the hydroxyl functional group of the amino acid side chain of the gluten protein with a phosphorus-containing material to form a gluten-derived flame retardant macromolecule.

14. The process of claim 13, wherein the amino acid side chain having the hydroxyl functional group corresponds to a tyrosine side chain of the gluten protein, a threonine side chain of the gluten protein, a serine side chain of the gluten protein, or a combination thereof.

15. The process of claim 13, wherein the phosphorus-containing material includes a phosphoryl group and a chloride group.

16. The process of claim 15, wherein the phosphorus-containing material includes a phosphonate material or a phosphine oxide material.

\* \* \* \* \*